UNITED STATES PATENT OFFICE.

SIDNEY G. THOMAS, OF 3 QUEEN'S ROAD VILLAS, COUNTY OF SURREY, ENGLAND.

IMPROVEMENT IN DEPHOSPHORIZING IRON.

Specification forming part of Letters Patent No. 216,910, dated June 24, 1879; application filed February 13, 1879; patented in England, January 22, 1878.

*To all whom it may concern:*

Be it known that I, SIDNEY GILCHRIST THOMAS, of 3 Queen's Road Villas, in the county of Surrey, England, have invented a new and useful Process for Improvements in the Manufacture of Steel and Iron, which process is fully set forth in the following specification.

These improvements consist in effecting the removal of phosphorus from the metal of which steel may be made by adding to the molten metal in a converter or vessel having a calcareous or magnesian lining large quantities of basic material, whereby the phosphorus is caused to pass into and combine with a highly-basic calcareous slag, which, by this process, is produced and maintained during the operation by the Bessemer (or pneumatic) or Siemens-Martin, Siemens, Pernot, Ponsard, or similar steel-making processes.

In the above processes as at present carried out little or no phosphorus is removed either into the slag or otherwise.

In carrying out these improvements the constant object is to produce a highly basic calcareous slag, in which phosphorus may be retained and by which removed. To effect this result, when the Bessemer process is employed I use a basic calcareous or magnesian lining for the converter, and add to the metal in the converter such a quantity of lime and oxide of iron, or lime alone, as will insure the slag being highly basic and calcareous, particularly during the latter part of the blow. I find that the amount of silica in a slag in which it is desired to remove phosphorus to any considerable extent should not materially exceed twenty-five per cent., while when a very phosphoretic iron is being treated it is very desirable that the final slag should contain less than twenty per cent. of silica. If more than thirty-three per cent. of silica is present little or no phosphorous will be removed. The slag must also contain a minimum of twenty per cent. of lime and magnesia together, while it is desirable it should contain over thirty per cent.

The best results are obtained when the amount of slag is such that, after the whole of the phosphorus contained in the pig treated has been transferred to it, it will not contain more than about twelve to fourteen per cent. of phosphoric acid. To obtain this result a very large quantity of basic material must be added to the charge.

As a general rule an amount equal to five times the weight of the silicon and phosphorus contained in the charge must be added. At least two-thirds of this addition should consist of lime, or lime and magnesia. This addition may be made in the following manner: Before tapping the molten metal into the converter I throw into the converter an amount of highly-heated newly-burned lime about equal in weight to the silicon and phosphorus contained in the charge of pig to be operated on. If, however, on account of the coldness of the converter or any other reason, there is reason to believe the metal will not blow hot enough, the amount of lime first thrown in may be reduced. The metal is then run in and blown in the usual way until sufficient heat has been developed to enable the final basic addition, as hereinafter described, to be made without prejudicially cooling the metal. When in the judgment of the blower this point has been reached the vessel is turned down, and highly-heated lime in small pieces, with highly-heated or molten iron ore (which should be as non-silicious as possible) is thrown in, in the proportion of two parts of lime to one of ore. The lime may with advantage be a magnesian lime.

The preferable mode of preparing this addition is to melt the lime or limestone with the ore in a small basic-lined cupola or air furnace, and add it in a molten state. A basic-lined furnace should also be used for melting the ore when the ore alone is added in a molten condition.

In order to prevent the ore or ore mixture from "setting," it should be transferred very rapidly from the furnace in which it is melted to the converter, either by using a very short basic-lined runner or by tapping into a basic-lined ladle, and so rapidly transferring it to the converter.

The basic addition should always be as hot as possible, and as free as possible from silica. The weight of this final basic addition should be about four times that of the silicon and phosphorus in the charge.

When the pig treated is high in silicon and manganese and blows very hot, the whole of the basic addition may consist of lime very highly heated, and equal in weight to from four to five times the weight of the silicon and phosphorus in the charge. When lime alone is used it may be either added in two separate additions, as before described, which I prefer, or it may be all added before the metal. I prefer the use of magnesian lime. I prefer, however, to make a part of the addition always consist of oxide of iron. I have obtained excellent results with my basic slag system when blowing very phosphoretic pig in a stationary converter with a low-pressure blast.

In carrying out the various open-hearth processes for the manufacture of steel and ingot-iron it has hitherto been the practice to work with a silicious slag containing not less than forty per cent. of silica.

In carrying out my improvements in these processes I find it is necessary, in order to produce a highly-basic calcareous slag, not only to have the hearth lined with a basic calcareous or magnesian material, but to add very large quantities of lime and oxide of iron during the operation. The amount of this basic addition should be about the same as in the Bessemer converter, except that in those open-hearth processes in which no blast is used to accelerate the decarbonization a considerable additional amount of oxide of iron should be added to facilitate the oxidation of the phosphorus. In the Siemens or ore process it is of course only necessary to add lime or limestone. The amount of lime added should be at least equal to from three to four times the weight of the silicon and phosphorus of the charge, besides enough to neutralize any silica contained in the ore added. About half the total amount of base to be added may be thrown onto the hearth with or before the charge, the remainder being added during the operation; or the whole of the basic addition may be thrown in with or before the charge. When there is plenty of gas in the furnace it is preferable to add the lime as limestone, double as much limestone being of course added as there is lime needed. Magnesian lime or limestone may always be used instead of ordinary lime.

The proportions of silica and lime to be aimed at in the slag are the same as in the Bessemer process, and the workmen should take samples of the slag from time to time to ascertain that it has the proper earthy fracture.

In order to facilitate the production of a basic slag, the slag first produced may, if it have a silicious character, be partly tapped off before fresh base is added.

In carrying out both the Bessemer process and the Siemens or other similar processes, I prefer to line the vessel or hearth with one of the basic linings for which I am now making application for Letters Patent; but other calcareous or magnesian linings may be used. I would point out that the production of a basic slag is only of importance when it is desired to remove phosphorus from the iron treated.

I am aware that it has been proposed to add small quantities of lime and of oxide of iron and other bodies to the contents of Bessemer converters, such converters having been in practice hitherto only lined with highly silicious substances.

I am also aware that a few pounds of limestone are in practice sometimes added to the contents of the converter; but this is of no avail in producing a basic slag or for the elimination of phosphorus, and even when a basic lining is used very large additions of base, principally calcareous, must be added, sometimes amounting to four hundred weight for every ton of metal treated.

I am also aware that certain basic substances have been suggested as suitable for lining Bessemer converters and open-hearth furnaces, but, having proved unsuitable, have not been commercially employed.

I am also aware that in making iron by the blast-furnace, cupola, and puddling-furnace processes dolomite has been added to the charge of ore and carbonaceous matter, in the expectation of dephosphorizing the metal, and that such furnaces may be fixed or fettled with dolomite, or a concrete of which it is an element. This use of dolomite has been extended only to iron-making, and is but preparatory to the pneumatic or open-hearth processes for treating metal to convert it into steel or ingot-iron. A lining of four parts of ore and one of dolomite, while serving well in a blast or like furnace, would not stand the high heat of the Siemens or Bessemer processes. It has been proposed to add dolomite in large quantities to blast and similar furnaces; but practically this would be covering the metal with an impenetrable mass of infusible matter, and dolomite so added in the Bessemer process, if uncalcined, would render the process a failure by reason of the driving off of the carbonic acid, too rapidly cooling the metal. Lime alone, not limestone, is effectual in the Bessemer process.

I am also aware that it is not new to line furnaces with a basic material composed of lime or magnesia, or a mixture of the two with or without oxide of iron.

I wish to point out that the addition of basic substances to a converter with a silicious lining is followed by a rapid destruction of the lining, so that it is commercially impossible to obtain by this means a sufficiently basic slag to secure the removal of phosphorus to any advantageous extent, even when a large quantity of base is added. Nor can phosphorus be commercially removed by the use of basic linings, unless a very large quantity of basic material be added to the charge, so as to obtain economically a highly-basic slag such as I have described.

The simple use of any basic lining sufficiently durable to answer commercially will not suffice to remove phosphorus, as the wear of any lining which is sufficiently durable to answer commercially is insufficient to yield the necessary amount of earthy base.

I am also aware that iron ore, and sometimes also a little lime, is added to the charge in carrying out certain open-hearth processes, these processes being, as is well known in practice, always carried out on a silicious hearth. This addition of ore and a small quantity of lime is not, however, made with the view of rendering the slag highly basic and calcareous; nor is this result ever obtained, owing both to the silicious nature of the ordinary hearth and to the insufficient amount of lime added.

I wish also to point out that the removal of phosphorus in the pneumatic and open-hearth processes has always been the great desideratum in the manufacture of steel and ingot-iron, and that until my invention it has never been practically effected.

I do not claim the mere use of basic additions in either the Bessemer or open-hearth processes; but What I do claim, and desire to secure by Letters Patent, is—

1. In the dephosphorizing of iron, where highly-basic slag is produced in the Bessemer or open-hearth operations, the process of producing such slag, which consists in lining the converter or other vessel with calcareous or magnesian material, and adding to the molten metal therein basic material containing two-thirds of lime or lime and magnesia, and of a gross weight equal to about five times the weight of the silicon and phosphorus contained in the charge, the said basic material being divided, and a part added before tapping and the remainder after this has been blown, or the whole quantity added at once, substantially as specified.

2. In the manufacture of steel or ingot-iron by the Bessemer (pneumatic) or open-hearth processes, the herein-described method of removing the phosphorus from the metal into the slag, consisting in melting the metal in a converter or vessel having a calcareous or magnesian lining, and adding to such molten metal in the vessel so lined a quantity or quantities of basic material, such as burnt lime, or a mixture of burnt lime and iron ore, equal to about five times the weight of the silicon and phosphorus in the pig, substantially as described.

Witness my hand this 20th day of January, 1879.

SIDNEY GILCHRIST THOMAS.

Witnesses:
PHILIP M. JUSTICE,
ALLEN P. JONES.